United States Patent [19]

Ayvazian

[11] 4,161,822
[45] Jul. 24, 1979

[54] SKATE BLADE ANALYZER

[76] Inventor: Norman R. Ayvazian, 1 Patriots Cir., Woburn, Mass. 01801

[21] Appl. No.: 910,848

[22] Filed: May 30, 1978

[51] Int. Cl.² ........................... G01B 5/00; G01B 3/14
[52] U.S. Cl. ............................. 33/174 R; 280/11.37 R
[58] Field of Search ............ 33/1 BB, 174 R, 174 Q, 33/174 M; 280/11.37 R, 11.37 T

[56] References Cited

U.S. PATENT DOCUMENTS

| 1,630,299 | 5/1927 | Johnson | 33/174 R |
| 2,650,437 | 9/1953 | Glynn | 33/174 R |
| 3,099,092 | 7/1963 | Crance, Jr. | 33/174 R |
| 4,021,054 | 5/1977 | Csutor | 280/11.37 R |

*Primary Examiner*—Richard R. Stearns
*Attorney, Agent, or Firm*—John N. Randolph

[57] ABSTRACT

An apparatus for use in analyzing an ice skate blade for determining the tangent or high point of the edge of the blade, between the two supports of the blade holder, and to enable a skate sharpener to change the location of the tangent point, if necessary, to improve the skater's performance.

6 Claims, 6 Drawing Figures

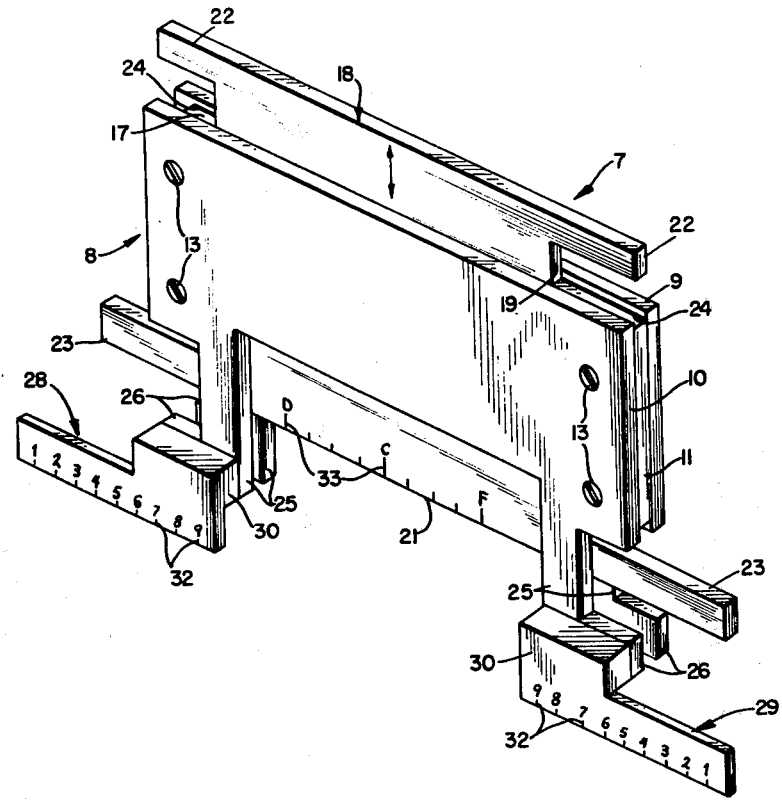

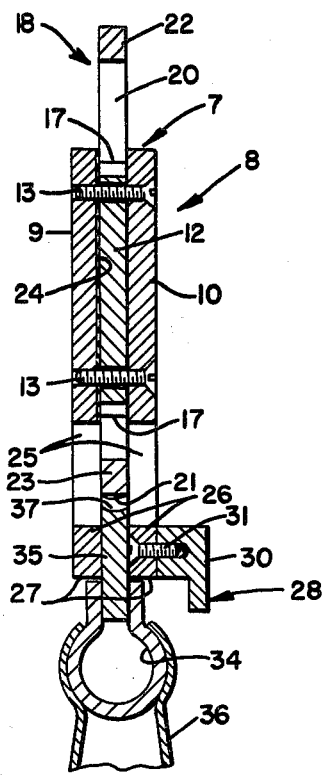
FIG. 3
FIG. 4
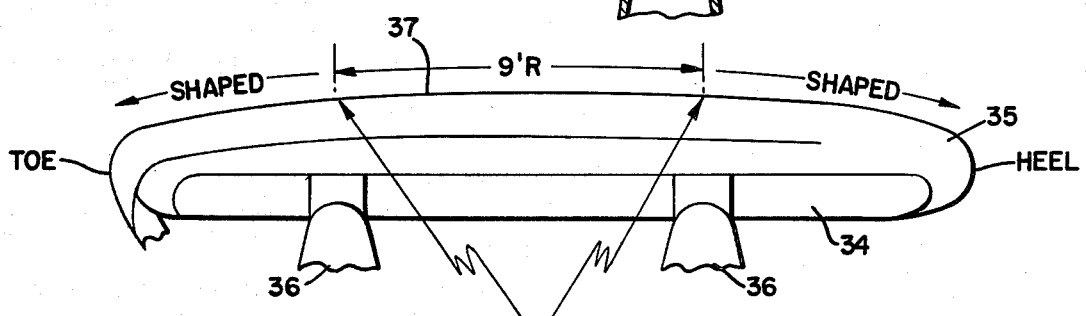
FIG. 5
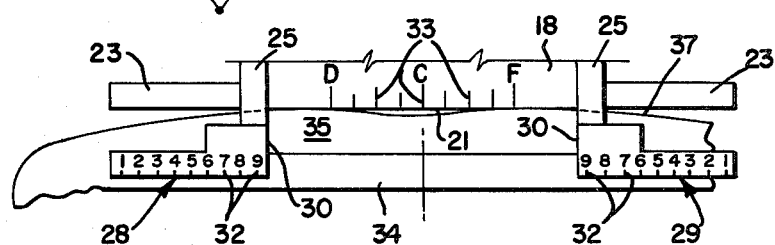
FIG. 6
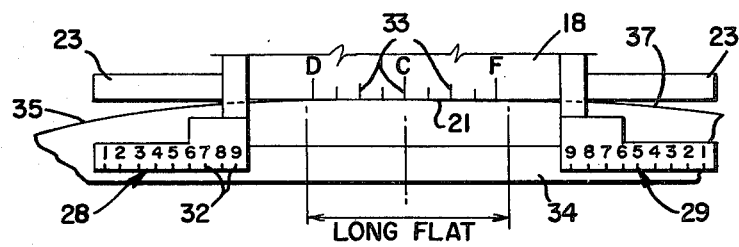

SKATE BLADE ANALYZER

BACKGROUND OF THE INVENTION

The edge of a hockey skate blade is initially ground to a radius of approximately nine feet between the two blade holder supports and is shaped off at both ends of said blade edge. When the tangent point or high point lies to the right of the center of the two blade holder supports, nearer the rear end or heel of the blade than the forward end or toe thereof, it assists the skater in skating forward and is the desired location for the tangent point for a hockey player playing a forward position. When the tangent point is on the other side of the center, toward the toe of the skate, it aids a skater in skating backwards and is therefore advantageous to a defensive player. A tangent point located midway of the two blade holder supports is most advantageous to a hockey center who requires maximum mobility for both forward and backward skating and for turning.

SUMMARY

Accordingly, it is a primary object of the present invention to provide a relatively simple apparatus than can be readily applied to the holder of a skate blade and accurately centered relative to the two holder supports for use in accurately determining the tangent point or high point of the edge of the blade, between said supports, so that said blade edge can be correctly sharpened to suit the needs of the user.

A further object of the invention is to provide such a device which will also function to indicate spaced humps in a blade edge or a long flat edge surface between the blade holder supports, either of which abnormal conditions can thereafter be corrected by sharpening.

Various other objects and advantages of the invention will hereinafter become more fully apparent from the following description of the drawings illustrating a presently preferred embodiment thereof, and wherein:

BRIEF DESCRIPTION OF THE DRAWINGS

FIG. 3 is a cross sectional view of an analyzer taken substantially along a plane as indicated by the line 3—3 of FIG. 2;

FIG. 4 is a fragmentary side elevational view of a portion of an ice skate showing the shape of the blade edge, as initially ground, to an approximate nine foot radius;

FIG. 5 is a fragmentary side elevational view of a portion of the blade and blade holder and showing a part of the blade analyzer applied thereto for indicating an inaccuracy in the blade edge, and FIG. 6 is a view similar to FIG. 5, but showing the analyzer as it will appear for indicating a different inaccuracy in the blade edge.

DESCRIPTION OF THE PREFERRED EMBODIMENT

Figure 2:
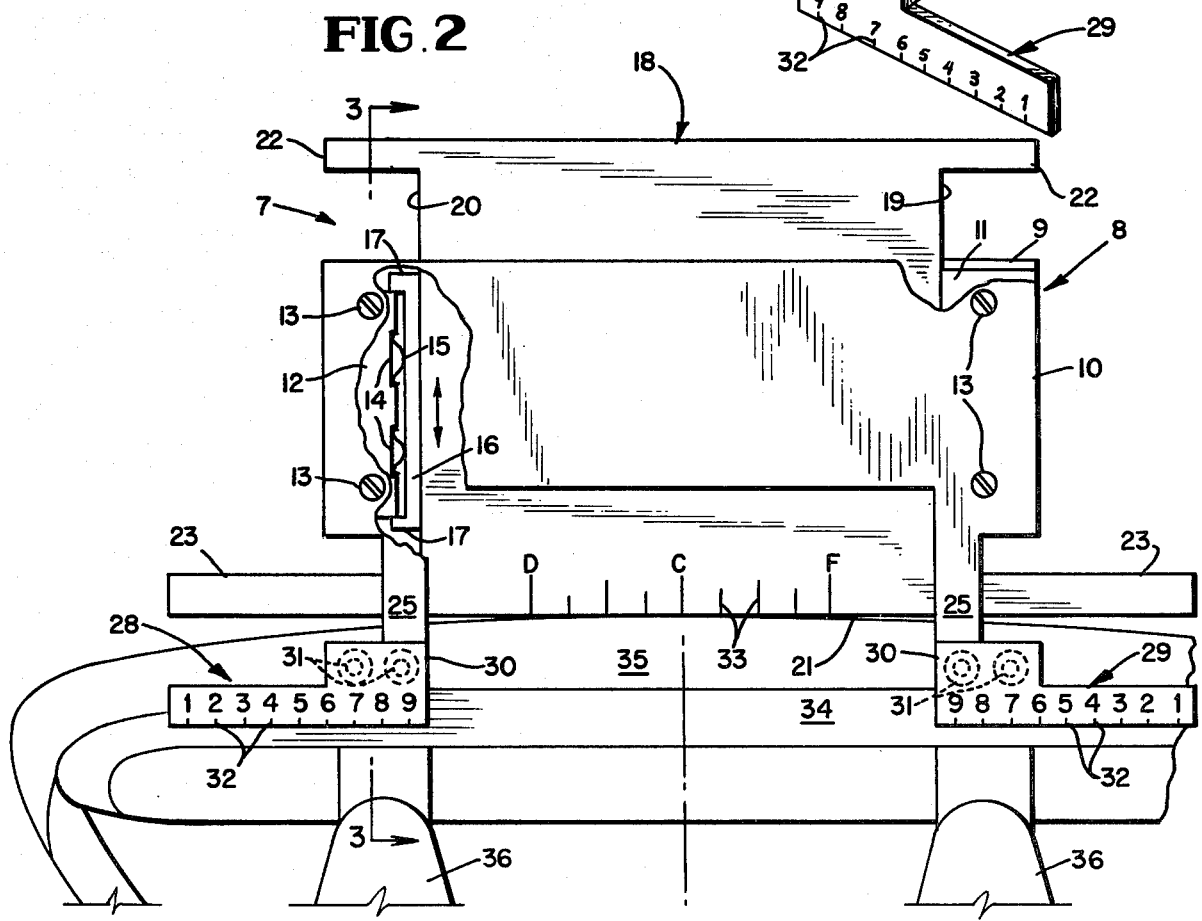
FIG. 2 is a side elevational view, partly broken away, showing the blade analyzer applied to the holder of an ice skate blade for accurately locating the tangent point or high point of the blade edge, between the blade holder supports.

Referring more specifically to the drawings, the skate blade analyzer in its entirety and comprising the invention is designated generally 7 and includes a support 8 having a back plate 9, a front plate 10, a spacer 11, located between corresponding ends of the plates 9 and 10, and a spacer 12, located between the opposite ends of the plates 9 and 10. Screw fastenings 13 extend through the plates 9 and 10 and the spacer 11 and other screw fastenings 13 extend through the plates 9 and 10 and the spacer 12 for securing the plates together and the spacers between the plates. As seen in FIG. 2, the inner edge of the spacer 12 is recessed, as seen at 14, to accommodate leaf spring elements 15 which bear yieldably against a follower member 16 having outturned end portions 17 which slidably bear against the ends of the spacer 12.

An indicator member 18, in the form of a plate, fits slidably in the support 8 between the plates 9 and 10 and has a side edge 19 bearing against the inner edge of the spacer 11 and a side edge 20, against which the inner side of the follower 16 bears. The edges 19 and 20 are disposed perpendicular to a bottom edge 21 of the indicator 18. The follower 16 yieldably retains the edge 19 against the inner edge of the spacer 11, for a purpose that will hereinafter be described, while exerting only a slight pressure on the indicator to enable it to still slide freely between the plates 9 and 10. The upper end of the indicator 18 has an extension 22 at each end thereof to limit the extent that said indicator can slide downwardly between the plates 9 and 10, and the lower end of the indicator 18 has extensions 23 at the ends thereof to limit the extent that said indicator can slide upwardly between the plates 9 and 10. The bottom edges of the extensions 23 form end portions of said bottom edge 21. Thin shims 24 are disposed between the back plate 9 and the spacers 11 and 12 to provide sufficient space between the plates 9 and 10 so that said plates will not bind against the front and rear faces of the indicator 18.

Figure 1:
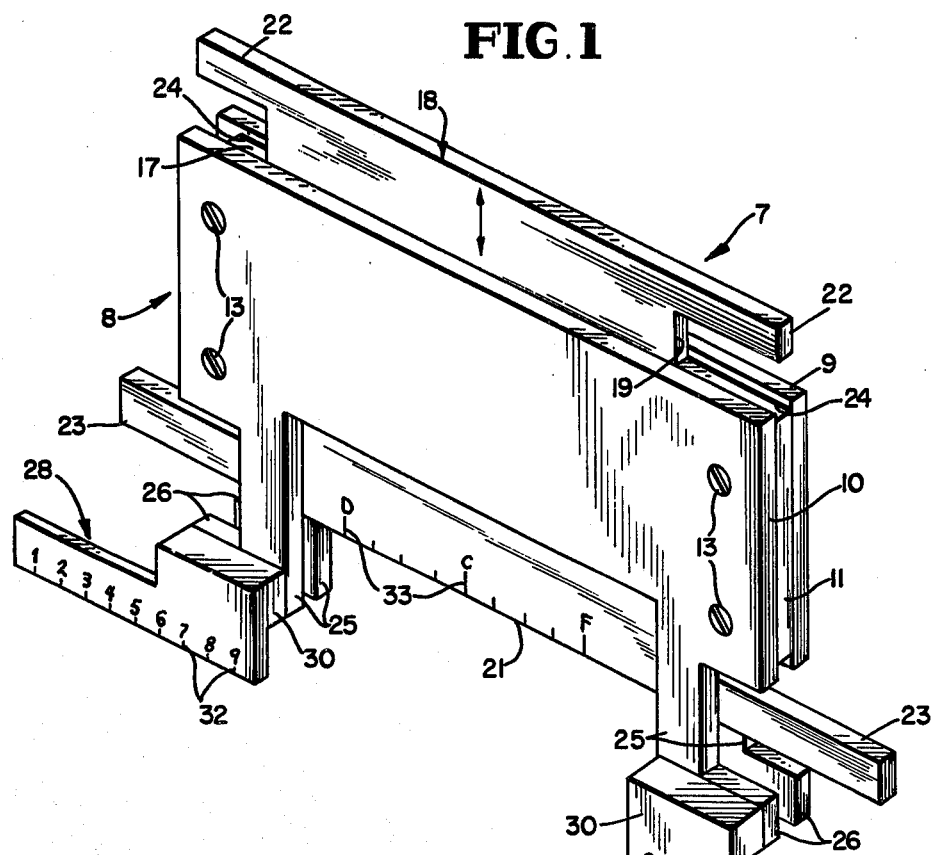
FIG. 1 is a perspective view of the skate blade analyzer.

Plates 9 and 10 have corresponding depending legs 25 adjacent the ends thereof which are provided with outturned foot members 26 at their lower ends, as best seen in FIG. 1. The four foot members 26 have coplanar bottom edges 27, FIG. 3, which are disposed perpendicular to the inner edge of the spacer 11 and thus parallel to the bottom edge 21 of the indicator 18. Wing members 28 and 29 have upwardly offset inner end portions 30 which are disposed against the front faces of the foot members 26 of the front plate 10 and secured thereto by screw fastenings 31. The front side of the wing members 28 and 29 are provided with graduations 32 which are successively numbered from "1" through "9" from the outer to the inner ends of said wing members. The front side of the indicator member 18 is provided with spaced graduations 33 extending upwardly from its bottom edge 21, the center of which is indicated by a "C", a left hand end one of which is indicated by a "D", and a right hand end one of which is indicated by an "F".

A portion of a conventional hockey skate is shown in FIGS. 2 through 6 including a blade holder 34, in which is mounted an ice skate blade 35, and a pair of supports 36 in which the blade holder 34 is secured. The blade 35 of a hockey skate has its edge 37 usually ground initially to a nine foot radius between the supports 36 and with the end portions of said edge shaped on a curvature to the ends of the blade as indicated by the "TOE" and "HEEL", FIG. 4.

To utilize the analyzer device 8, with the ice skate inverted, as seen in FIG. 2 to 6, the legs 25 of the two plates 9 and 10 are positioned to straddle the blade 35, so that the bottom edges 27 of foot members 26 will rest on the coplanar upper edges of the blade holder 34, as seen in FIG. 3. The blade analyzer is then adjusted lengthwise of the holder 34 until corresponding numerals of the graduations 32 of the wing members 28 and 29 are centered above the blade holder supports 36. The plate 18 is then slid downwardly, if necessary, until its bottom edge 21 contacts the blade edge 37. Since the bottom surfaces 27 of the foot members are disposed parallel to the bottom surfaces 21 of the plate 18, the point of contact of the edge 21 with the blade edge 37 will constitute the tangent point or high point of said blade edge. In FIG. 2, this is indicated to be slightly toward the toe of the blade or between "C" and "D" of the graduations 33, so that the blade edge 37 would be correct for a defensive player who most frequently skates backwards. However, if the skate was to be used by an offensive player, the edge 37 would require sharpening to locate the tangent point on the graduations between the "C" and "F". If the skate is to be used by the center of a hockey team, the tangent point should coincide with the graduation 33 designated "C".

FIG. 5 shows a part of the blade analyzer applied to a hockey skate wherein the blade edge 37 is indicated to have two high points or humps. FIG. 6 is a similar view but which indicates a blade edge 37 having a long flat surface rather than a single high point or tangent point. Each of these blades will single high point or tangent point. Each of these blades will require sharpening to correct its defect. It will be understood that the blade analyzer can be utilized a second time, in the same manner as heretofore described, in checking the accuracy of the sharpening operation and to indicate any still existing defect therein.

Various modifications and changes are contemplated and may be resorted to, without departing from the function or scope of the invention.

I claim as my invention:

1. An ice skate blade analyzer comprising a support having foot members provided with coplanar bottom surfaces adapted to rest on an inverted ice skate blade holder and to straddle a part of the blade extending upwardly from the holder, said support having a slot disposed above and between the foot member, a slide member mounted in said slot and disposed substantially parallel to the blade for movement toward and away from the blade edge, said slide having a bottom edge disposed substantially parallel to the bottom surfaces of said foot members, means carried by said foot members for indicating when said support is centered relative to the blade holder supports, and means carried by said slide, adjacent to its bottom edge, for indicating the location of the tangent or high point of the blade edge which contacts said bottom edge of the slide member.

2. An ice skate blade analyzer as in claim 1, said support including back and front plates, spacers secured between said plates in spaced apart relation to one another and combining with the plates to define the slot.

3. An ice skate blade analyzer as in claim 2, said slide member comprising a plate having elongated end portions forming abutments for engagement with said spacers for slidably confining the slide in the support.

4. An ice skate blade analyzer as in claim 2, a follower mounted between one edge of said slide and one of said spacers, and spring means interposed between said last mentioned spacer and the follower for urging the follower into engagement with said edge of the slide to retain another edge of the slide in abutting engagement with the other spacer for retaining said bottom edge of the slide parallel to the bottom surfaces of said foot members.

5. An ice skate blade analyzer as in claim 2, said front and rear plates having end portions, legs depending from said end portions, said legs having outwardly extending bottom portions defining said foot members.

6. An ice skate blade analyzer as in claim 5, said means for indicating when the support is centered relative to the blade holder supports comprising wing members secured to the front sides of the foot members of the front plate and having graduations extending along front sides thereof for locating the support centered above the blade holder supports.

* * * * *